Jan. 31, 1950 E. V. TAYLOR 2,495,948
VERTICAL AXIS FOOD GRINDER OR COMMINUTOR
Filed June 12, 1946 4 Sheets-Sheet 1

INVENTOR.
EUGENE V. TAYLOR
BY
ATTORNEYS.

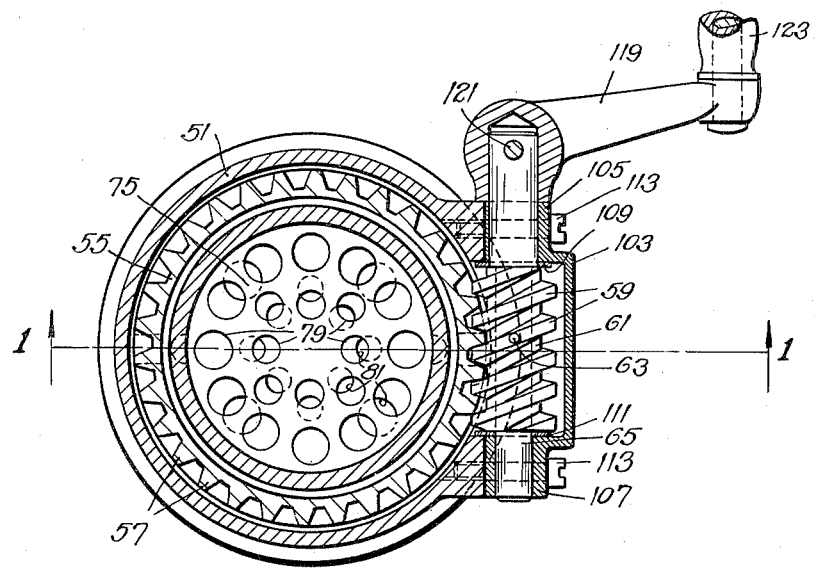
FIG. 2
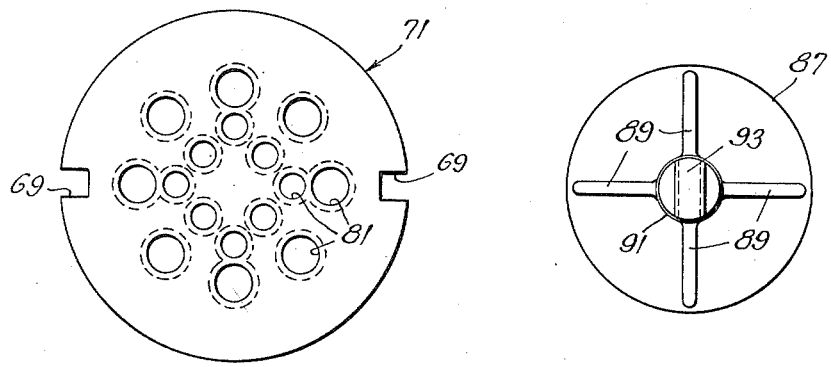
FIG. 3
FIG. 4
INVENTOR.
EUGENE V. TAYLOR
ATTORNEYS.

Jan. 31, 1950     E. V. TAYLOR     2,495,948
VERTICAL AXIS FOOD GRINDER OR COMMINUTOR

Filed June 12, 1946     4 Sheets-Sheet 3

INVENTOR.
EUGENE V. TAYLOR
BY
ATTORNEYS.

INVENTOR.
EUGENE V. TAYLOR
ATTORNEYS.

Patented Jan. 31, 1950

2,495,948

UNITED STATES PATENT OFFICE 2,495,948

VERTICAL AXIS FOOD GRINDER OR COMMINUTOR

Eugene V. Taylor, Chicago, Ill.

Application June 12, 1946, Serial No. 676,304

2 Claims. (Cl. 146—192)

My invention relates generally to food processing apparatus and more particularly to food processing apparatus which is adapted for comminution of various materials to produce foods or food products.

Devices for grinding or comminuting food such as meat and vegetables have long been in use in homes and restaurants. Such devices afford a ready means for putting in useful and palatable form scraps of meat and left-over vegetables which either are not considered presentable in their left-over form or are difficult to masticate because of their stringy or tough structure. A common type of such device has been sold for many years and comprises a frame, which is securable to the edge of a table or shelf, having an integral L-shaped hopper supporting a horizontally positioned rotatable worm for moving the food toward a die at the end of the horizontal arm of the hopper. The shaft of the worm extends in opposite directions, one end passing through a vertical wall of the hopper and being connected with a handle and the other end passing through the die and being secured to a cutting element which is positioned adjacent the die.

One serious defect with such a grinding or chopping device is that the food must be continuously pressed down into the worm by the fingers. Frequently the fingers get pinched or cut while pressing the food into the rotating worm. It is an object of my invention to provide a food processing device which does not require the use of the fingers or of a worm for directing the food toward the die and cutting element.

Another defect with said common type of grinding device is that its grinding capacity is limited by the worm which is actually an obstruction in the hopper. Pieces of food over a certain size cannot be handled by the worm. In my form of food processing apparaatus this difficulty is entirely avoided since I employ no worm or similar element which would obstruct the hopper.

The common form of food grinder or chopper also lacks flexibility in another respect, namely, in its inability to perform any other than a grinding or chopping action. It is an object of my invention to provide interchangeable parts which will, for example, scrape or shave pieces of food or will extract and strain juice from fruits and vegetables. In this connection it is a further advantage of my invention that the means for impelling the food through the hopper may be employed without the necessity for rotating any cutting or scraping member, for example, when extracting the juice from fruits or vegetables.

Another advantage of my invention resides in the use of a geared drive for the rotating cutting member whereby sufficient force may be provided for cutting even the toughest forms of food with the least exertion by the operator.

It is another object of my invention that the gearing for the geared drive may be supported by, and at least partially housed by, the food hopper externally of the throat of the hopper. It is still another object that the gearing and rotatable cutting members driven thereby may be easily removable for cleaning and inspection.

Other objects, advantages and uses will become apparent from consideration of the following written description and from reference to the drawings in which:

Figure 2 is a horizontal, sectional view taken on the plane of line 2—2 of Figure 1 and showing the food hopper, comminuting means and the geared driving means therefor;

Figure 3 is a plan view of the rotatable cutter or comminuting means of Figure 1;

Figure 4 is a plan view of the food presser plate of Figure 1;

Like reference numerals are employed for the same elements in the several views.

Figure 1:
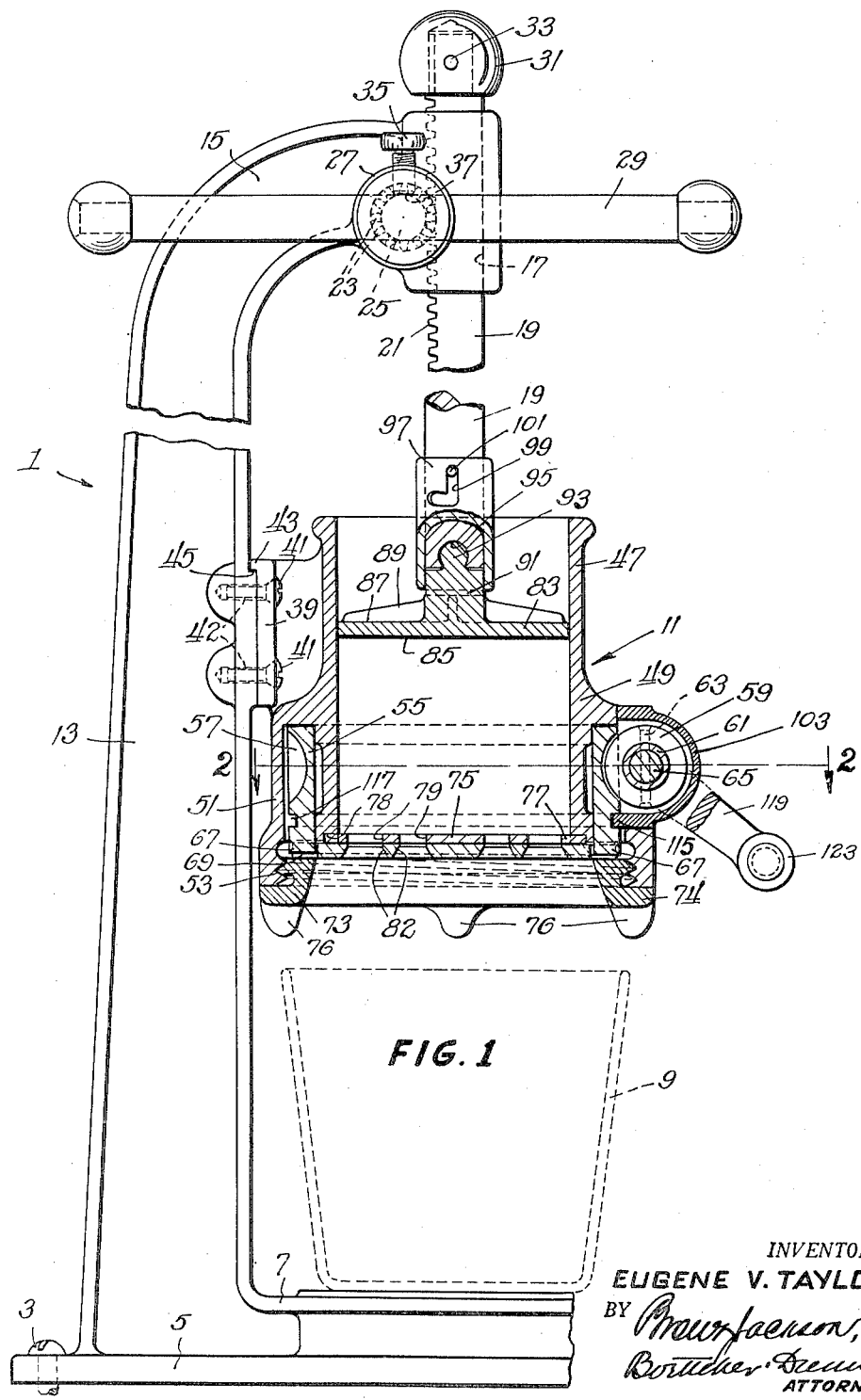
Figure 1 is a vertical, sectional view of my food processing apparatus taken on the plane of line 1—1 of Figure 2 and showing the supporting elements in elevation.

Referring now to Figures 1 through 4 of the drawings, the reference numeral 1 refers generally to the C-shaped supporting stand or frame of my food processing apparatus, which stand may be secured to a table, bench or shelf (not shown) by suitable fastening means such as screws 3 which pass through holes in the base or pedestal 5. The base 5 includes a platform 7 for supporting a bowl or other receptacle 9 (shown in dotted lines) beneath the food hopper which is indicated generally by the reference numeral 11.

An upright arm 13 extends from the base 5 of the supporting stand 1 and is curved at its upper end as at 15 so as to terminate directly above the central axis of the food hopper 11. At the terminal end of the upright arm 13 there is formed a vertical cylindrical passageway 17 which serves as a guide for a vertically movable shaft or plunger 19. At the upper end of shaft 19 there are formed teeth 21 so that the shaft constitutes a rack which cooperates with the teeth 23 formed intermediate the ends of a short shaft 25 which is mounted for rotation in the bore of the cylindrical extension 27 formed integrally with the upright arm 13. As will be readily seen, the bore of the extension 27 and the vertical guide passageway 17 intersect to permit the meshing of teeth 21 with teeth 23. A double ended lever or handle 29 is connected at the end of shaft 25 to permit the operator to obtain leverage in rotating the shaft 25 for raising or lowering the shaft or plunger 19. If no leverage is needed in manipulating shaft 19, as would especially be the case when it is lifted from its lowered position, the operator may raise said shaft by gripping the knob 31 which is secured to the upper end of shaft 19 by means of a pin 33. The knob 31 also limits the extent of downward movement of shaft 19, as is apparent. It will be seen that the short shaft 25 is maintained in extension 27 against axial displacement by a set screw 35 which is threaded through the extension 27 and protrudes into a groove 37 in the shaft 25.

The hopper 11 is secured by an integral flange 39 to a mid-portion of the upright arm 13 of the supporting stand 1 by means of screws 41 which pass through holes in the flange and are threaded into sockets 42 in the arm 13. The flange 39 has an upper rim 43 which seats on a ledge 45 of the upright arm 13, the rim and ledge cooperating to locate the hopper vertically when it is being secured to the arm 13 and also serving along with the screws 41 to prevent downward movement of the hopper 11. This manner of fastening the hopper to the supporting stand 1 is merely by way of example for other means for securing the two elements together may be employed such as that illustrated in my application Serial No. 656,322 filed March 22, 1946, which became Patent No. 2,439,028 on April 6, 1948.

The throat of the hopper 11 is circular and is defined by wall 47 which has a flange 49 with an integral depending wall 51 which is concentric with and spaced from the wall 47. Wall 51 extends below the end of wall 47 and is there internally threaded as shown at 53. Positioned between the walls 47 and 51 is a ring gear 55 having teeth 57. The teeth 57 mesh with the threads 59 of the worm gear 61 which is secured by a pin 63 to a shaft 65. A pair of diametrically opposite downwardly extending lugs 67 on the ring gear 55 seat in notches 69 (see Figures 1 and 3) of a rotatable cutting disk indicated generally at 71.

The cutting or comminuting disk 71 is secured in place at the lower end of the hopper 11 by a ring 73 which is externally threaded and thereby secured in the lowermost end of the depending wall 51. Ring 73 has a flange 74 and lugs 76 on the lower edge of the ring, which lugs facilitate the turning of ring 73 to thread or unthread it from wall 51. The upper surface of ring 73 serves as a bearing surface for the rotatable cutting disk 71 and said disk 71 at its upper surface engages the lower surface of a die 75 and helps retain the die against axial movement.

The die 75 is circular except for two diametrically opposite radially extending lugs 77 which seat in notches 78 in the lower end of wall 47 of the hopper 11. The engagement of the lugs 77 in the notches prevents rotation of the die. There are a series of holes 79 of different sizes through the die 75 through which holes the food in hopper 11 may be impelled. As the food is impelled through the die it comes to a rotatable cutting disk 71 which has a series of different sized holes 81. The holes 81 have had their sides beveled as at 82 so as to form a cutting edge at the upper surface of each hole. It will be noted that the pattern of holes 79 in the die 75 and holes 81 in the cutting disk 71 do not entirely coincide. However, for any position of the rotatable cutting disk 71 there will be some of its holes 81, or portions of said holes, which coincide with the holes 79 of the die 75. Consequently, food being impelled through the holes 79 of the die 75 will pass out through certain coinciding holes 81 of disk 71 and, as the disk is rotated, the extruded food will be sliced off as the coinciding holes 81 pass to a closed or non-coinciding portion of the die 75. As said holes pass to a closed portion of the die other holes 81 of the rotating cutting disk 71 will come into coincidence with the holes 79 in die 75. As a result there will be a continuous passage of food through the die and a continuous cutting off of said food by the disk 71 so long as the food continues to be impelled through the die.

The impelling of the food toward and through the die is caused by actuation of the double ended lever or handle 29. Depending upon the direction of rotation of the handle 29 the shaft 19 is selectively moved upwardly or downwardly, i. e., away from or toward the hopper 11. The lower surface 85 of the presser plate 83 is flat while on the upper surface 87 strengthening ribs 89 converge on a central, axially extending projection 91. Projection 91 at its upper end carries a transversely extending key 93 which is adapted to fit into a correspondingly shaped channel or slot 95 in the lower end of shaft 19. Such connection can only be made by movement of the presser plate in a direction at right angles to its normal direction of movement in the hopper and consequently the connection can only be consummated when the shaft 19 is raised upwardly and out of the hopper 11. When the key 93 is engaged in the slot 95 the presser plate 83 is locked against axial separation from shaft 19. To prevent inadvertent transverse movement of the presser plate 83 relative to the shaft 19 with consequent disengagement of the key 93 from the slot 95, a locking collar 97 is employed. Collar 97 is slidable along the shaft 19 and is controlled in its movement by an L-shaped slot 99 formed in the collar and a cooperating pin 101 fastened in shaft 19 and protruding into slot 99. With the collar 97 in the position illustrated in Figure 1, the lower end of said collar covers the intersection of the key 93 and slot 95. When the collar 97 is lifted up and turned so that the pin 101 is in the horizontal arm of L-shaped slot 99, the lower end of the collar is above the intersection of key 93 and the slot 95. The collar is retained in this position by virtue of the engagement of the pin 101 in the horizontal arm of slot 99. At such time the presser plate 83 may be disconnected from shaft 19 by sidewise movement of the plate 83 and its key 93 relative to the shaft 19 and its slot 95, assuming that the presser plate has been raised up and out of the hopper 11. This form of connection of the presser plate to the shaft 19 permits easy substitution of one form of presser plate for another as will be more fully described hereinafter.

Unlike the common type of food grinder which employs a worm for impelling the food to the die and leaves a large untreated portion of food in the groove of the worm, my form of food processing apparatus with its flat surfaced presser plate 83 presses substantially all of the food in the hopper into the die 75 and the only untreated portion of food is the small amount in the holes of the die itself.

As noted above, the means for driving the rotatable cutting disk 71 comprises an annular ring gear 55 which has lugs 67 engaging in notches 69 of the disk 71. The teeth 57 on the ring gear 55 mesh with the worm 61 which is secured on shaft 65. A housing 103 for the worm 61 provides bearings 105 and 107 at its opposite sides for the shaft 65. Washers 109 and 111 are positioned about the shaft 65 and are interposed between the worm 61 and the end walls of the housing 103. Housing 103 is adapted to enclose an opening in the depending wall 51 of the hopper 11 and is secured to said depending wall 51 by screws 113 which pass through holes in the housing 103 and are threaded into the depending wall 51. A projecting portion 115 (see Figure 1) of the housing 103 fits into an annular groove 117 in the annular ring gear 55 and serves to retain the ring gear 55 from dropping out from between the walls 47 and 51 of the hopper 11 when the annular ring 73 and the rotatable cutting disk 71 are removed from the lower end of the hopper 11. To drive the shaft 65 on which the worm 61 is secured I affix a crank arm or handle 119 to one end of shaft 65 by means of a pin 121. A swivel knob 123 is secured to the outer end of the crank arm 119.

The ease with which my food processing apparatus may be assembled or disassembled for cleaning, lubrication or repair will become apparent from the following description. If the apparatus comes disassembled when purchased, the hopper 11 is first secured to the upright arm 13 of the support 1 by the screws 41 which are threaded through the flange 39 of hopper 11 and into the sockets 42 in the arm 13. The matching of the holes in flange 39 with the threaded sockets in the arm 13 is made easy because the rim 43 of the flange 39 is first positioned upon the ledge 45 of the arm 13. This locates the hopper vertically with respect to the arm 13 and it is then only necessary to shift the hopper 11 sidewise to match the holes in the flange 39 with the threaded sockets 42 in the arm 13. Annular ring gear 55 is then inserted between the walls 47 and 51 of the hopper 11. The housing 103 which carries the worm 61 and shaft 65 is then positioned against the side of the hopper in such a manner as to engage the threads 59 with the teeth 57 of the ring gear 55 while at the same time positioning the extension 115 on the housing 103 in the annular groove 117 of the ring gear 55. The screws 113 are then passed through holes in the housing 103 and are threaded into sockets in the depending wall 51 of hopper 11. Crank handle 119 is then secured to the end of shaft 65 by means of the pin 121. The die 75 is next inserted at the lower end of hopper 11 with its lugs being positioned in the notches 78 at the lower end of the wall 47 and immediately beneath said die 75 is inserted the rotatable cutting disk 71 which is positioned with its notches 69 in engagement with the lugs 67 depending from the ring gear 55. Annular ring 73 is then threaded upwardly until its flange 74 engages the lowermost end of the depending wall 51. At this time the rotatable cutting disk 71 is accurately positioned with respect to the die 75 and the ring gear 55.

Shaft 19 may then be inserted through the guide passageway 17 which is formed at the uppermost end of arm 13. Shaft 25, which is connected to the double armed lever or handle 29 and which has the gear teeth 23, is then slid into the bore of projection 27 so as to mesh its gear teeth 23 with the teeth 21 on the rack portion of shaft 19. The set screw 35 is then threaded through the projection 27 into the groove 37 which is formed in shaft 25 in order to retain said shaft in the bore of projection 27. Collar 97 on shaft 19 is then raised as far as the pin 101 in slot 99 will permit and is rotated so that the pin passes into the horizontal arm of the L-shaped slot 99 to retain the collar in its elevated position. When the shaft 19 is then moved upwardly to a position where its lower end is somewhat above the upper edge of hopper 11, the presser plate 83 may then be connected with the shaft 19 by inserting the key 93 of the presser plate 83 in the slot 95 formed in the lower end of shaft 19. When the projection 91 which bears the key 93 is positioned in axial alignment with the shaft 19, the locking collar 97 on shaft 19 is then rotated and permitted to move to its lowermost position, as shown in Figure 1, to lock the presser plate 83 in engagement with the shaft 19.

In employing the food processing apparatus the operator will place a receptacle on the platform 7 of the base 5 immediately beneath the hopper 11 and will then raise the shaft 19 either by gripping it by the knob 33 or by cranking it upwardly by the handle 29. The food to be processed will then be inserted into the hopper 11 and the shaft 19 will then be cranked downwardly by the handle 29 in order to press the food toward the die 75 at the lower end of the hopper 11. Simultaneously the operator will rotate the crank arm 119 to thereby cause rotation of the rotatable cutting disk 71 and, as the food is pressed downwardly by the presser plate 83 through the die 75 into contact with the cutting disk 71, the food will be comminuted and will drop into the receptacle beneath the hopper. It will be readily apparent that the operator may vary the relative speed of the downward movement of the presser plate and the rotating movement of the cutting disk 71 in order to vary the size of the comminuted food particles. If larger food particles are desired the presser plate 83 will be urged downwardly at a greater speed than usual or the crank arm 119 for driving the rotatable cutting disk 71 will be rotated more slowly than usual. This will permit food to be extruded through the die and through the holes in the cutting disk 71 for a longer period before being sliced off by the cutting disk.

It will be readily apparent that in place of the crank arm 119 for driving the gearing and rotatable cutting disk 71, there may be substituted a pulley wheel or gear for connecting the shaft 65 with the shaft of a power driven mechanism, such as an electric motor, which could also be supported by the stand 1.

Figure 5:
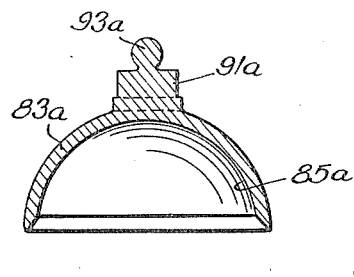
Figure 5 is a vertical, sectional view of another form of food presser member.
Figure 6:
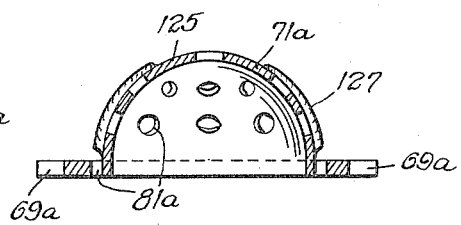
Figure 6 is a vertical sectional view of a different form of rotatable comminuting means which is employed with the food presser member of Figure 5.

In addition to being able to provide food particles of varying size my food processing apparatus has the additional advantage of being adaptable to the processing of a variety of food in a variety of manners. This adaptability is due to the interchangeability of food presser members and rotatable cutting members. Referring now to Figures 5 and 6 there will been seen a food presser member 83a which is formed with an internal curved surface 85a and which has a diameter substantially equal to the internal diameter of the hopper 11. An axial projection 91a formed integrally with the presser member 83a bears a key 93a of the same configuration as the key 93 of presser plate 83 in Figure 1. When shaft 19 is elevated to raise the presser plate 83 of Figure 1 from the hopper 11 said presser plate 83 may be unlocked from the shaft 19 by manipulation of the locking collar 97 as earlier described and the presser member 83a may be substituted for the presser plate 83 by inserting the key 93a in the slot 95 at the lower end of shaft 19 and thereafter locking it in place by lowering the locking collar 97. At this time the operator will also unthread the annular ring 73 by gripping it by its lugs 76. As the ring 73 is unthreaded the rotatable cutting disk 71 and the die 75 will drop down with it and may be removed. The rotatable member 71a of Figure 6 may then be inserted in place of disk 71 with its convex surface upward until the notches 69a engage the depending lugs 67 on the ring gear 55. Ring 73 will then be threaded back in place into the lower end of the hopper to position the rotatable member 71a in proper relation with respect to the ring gear 55. The upper surface of ring 73 will form the bearing surface for the member 71a.

Rotatable member 71a is formed with a curved surface 125 complementary to surface 85a of presser member 83a and has ridges 127 formed on the upward convex side. Holes 81a are formed through the curved surface and also through the periphery of the member. The presser member 83a and rotatable member 71a of Figures 5 and 6, respectively, are particularly adapted for removing the juice from fruit such as oranges or lemons which have been halved. The operator will raise the shaft 19 and presser member 83a connected therewith from the hopper 11 and will then insert a halved orange with its convex surface upward and thereafter will lower the presser member 83a to thereby cause the halved orange to be pressed down over the rotatable member 71a to press the juice from the orange. If the operator so desires he may simultaneously rotate the member 71a and its ridges 127 will grind against the interior of the orange to further remove the juice and also to divide the pulp, the juice and pulp passing readily through the holes 81a and dropping into a receptacle below the hopper 11. As is apparent the orange may be juiced merely by pressing it against the member 71a without rotating said member by turning of the crank arm 119.

Figures 7, 8:
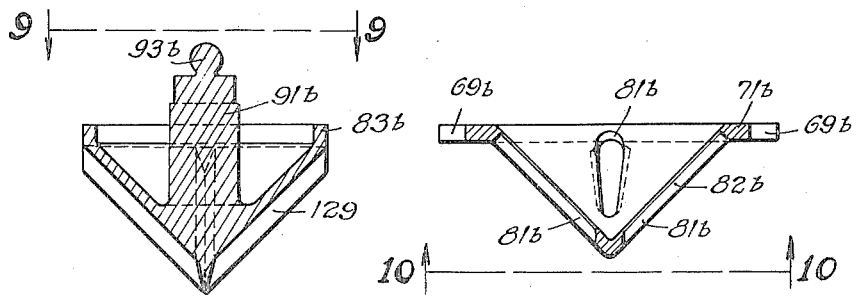
Figure 7 is a vertical, sectional view, taken on the plane of line 7—7 of Figure 9, of another form of food presser member.
Figure 8 is a vertical, sectional view, taken on the plane of line 8—8 of Figure 10, of a different form of rotatable comminuting means which is employed with the food presser member of Figure 7.
Figures 9, 10:
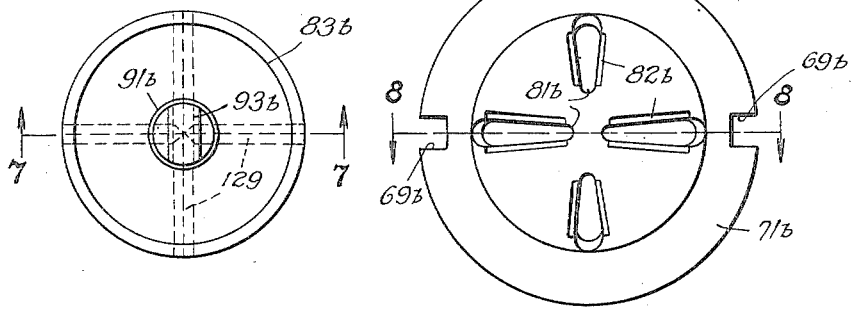
Figure 9 is a plan view, looking from the line 9—9 of Figure 7 in the direction of the arrows, of the form of food presser member shown in Figure 7.
Figure 10 is a plan view, looking from the line 10—10 of Figure 8 in the direction of the arrows, of the form of rotatable comminuting means shown in Figure 8.

Referring now to Figures 7 through 10 there will be seen another form of presser member 83b in the form of an inverted cone with ridges 129 which are triangular in cross-section. An axially extending projection 91b formed integrally with the presser member 83b carries at its upper end a key 93b which is adapted to fit within the correspondingly shaped slot 95 of shaft 19 of Figure 1. The diameter of the presser member 83b is substantially the same as the inside diameter of the hopper 11. The rotatable cutting member 71b shown in Figures 8 and 10 is also formed in the shape of an inverted cone and corresponds in configuration to the cone of the presser member 83b of Figures 7 and 9. Four slots 81b are formed in the rotatable cutting member 71b and said slots have their edges beveled as at 82b to form a cutting edge at the upper side of the slots. In the manner described above with respect to Figures 5 and 6 the presser member 83b of Figures 7 and 9 and the rotatable cutting member of Figures 8 and 10 may be substituted for the presser plate 83 and the rotatable cutting disk 71, respectively, of Figure 1. As the operator lowers the shaft 19 carrying the presser member 83b and rotates the cutting member 71b the food within the hopper will be scraped or shaved off by the slots 81b of the rotatable cutting member 71b.

Figure 11:
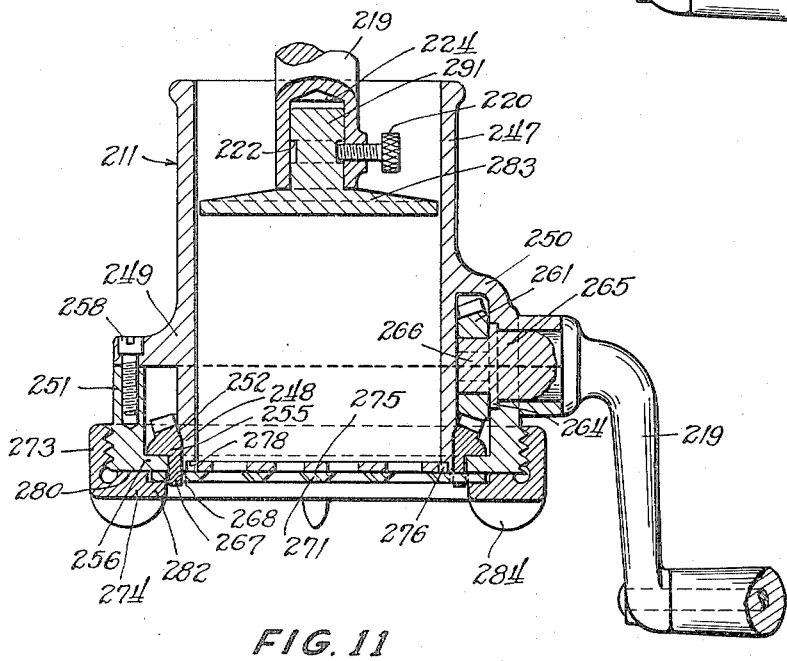
Figure 11 is a vertical, sectional view of a modified form of the rotatable comminuting means, geared drive and supports therefor.

In Figure 11 is shown a modification of the geared drive and housing therefor and also a modification of the means for securing the presser plate to the shaft which supports it. Reference numeral 211 indicates the hopper generally, which hopper has a flanged portion 249 which is expanded as at 250 to form a portion of a housing and a portion of a bearing for the stub shaft 265 which is formed integrally with the crank handle 219. The wall 247 of the hoper 211 is slightly reduced in diameter at its outer, lower end, as at 248, to form a beveled shoulder 252 for positioning a ring gear 255. Ring gear 255 is maintained in position by the beveled shoulder 252; also by a flange 256 formed at the lower end of a depending wall 251 which is secured to the flange 249 on the hopper 211 by screws 258. Depending lugs 267 formed on the ring gear 255 are adapted to fit into holes 268 on opposite sides of the rotatable cutting disk 271. Ring gear 255 meshes with a pinion 261 which is drivingly connected with the squared end 266 of stub shaft 265 on crank handle 219.

Positioned immediately above the cutting disk 271 is a die 275 which is prevented from rotating by lugs 276 which are seated in notches 278 formed in the lower end of the hopper 211. An internally threaded ring 273 has a stepped flange 274, one step 280 being adapted to abut against the lower surface of the depending wall 251 and the other step 282 being adapted to support the periphery of the rotatable cutting disk 271 when the annular ring 273 is threaded on to the lower end of wall 251. Depending lugs 284 are formed at the lower edge of the ring 273 to make easy the turning of the ring.

It will be seen that depending wall 251 forms one-half of the housing for pinion 261 and one-half of the bearing for shaft 265 when the depending wall 251 is secured to the flange 249 of hopper 211. At such time the crank handle 219 cannot become disengaged by reason of an integral flange 264 which seats in complementary recesses in the flange 249 and depending wall 251.

Presser plate 283 is secured to the shaft 219 by means of a set screw 229 which may be threaded into an annular groove 222 on the axial projection 291 of the presser plate 283 when said projection 291 is inserted in the socket 224 at the lower end of shaft 219.

In assembling the geared drive mechanism with the hopper and rotatable cutting disk of Figure 11 the operator will first insert the pinion 261 and associated shaft 265 on handle 219 in place beneath the flange 249 and will then place beneath the shaft 265 and the flange 249 the depending wall 251 with the ring gear 255 already seated upon the flange 256 of said depending wall. The screws 258 will then be inserted through the flange 249 and threaded into the sockets in the depending wall 251. There will then be provided a housing for the ring gear 255 and the pinion 261, as well as a bearing for the shaft 265. The die 275 may then be positioned with its lugs 276 engaging in the notches 278 at the lower end of the hopper 211 and the rotatable cutting disk may be positioned beneath it with its holes 268 surrounding the depending lugs 267 of the ring gear 255. The ring 273 is then threaded upon the lower end of depending wall 251 until the step 280 on flange 274 of ring 273 abuts against the lower surface of wall 251. Rotatable cutting disk 271 then finds its bearing upon the step 282 of flange 274. Rotation of the crank arm 219 will then serve to drive the disk 271.

It will be readily seen that removal of the ring 273 will permit the substitution of different forms of rotatable cutting members in place of the cutting disk 271. Such substituted cutting members may take the form of the devices illustrated in Figure 6 and Figure 8, for example.

Figure 12:
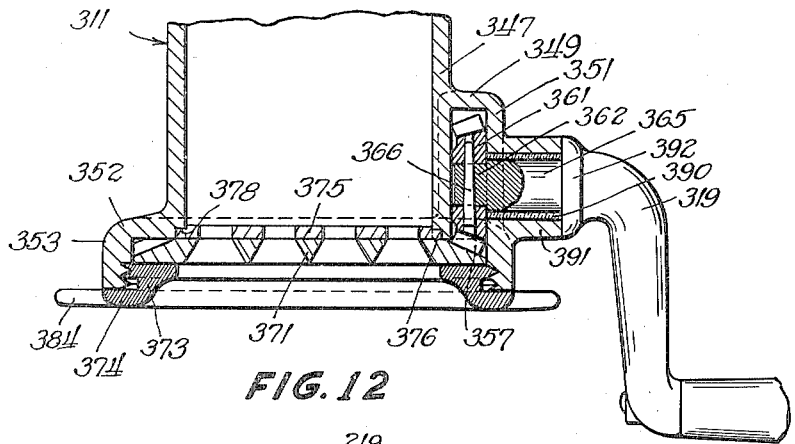
Figure 12 is a vertical sectional view of another modified form of rotatable comminuting means, geared drive and supports therefor.

In Figure 12 there is illustrated another form of geared drive and housing therefor. The hopper indicated generally at 311 has an integral flange 349 connected to the wall 347, which flange encircles a portion of the circumference of said wall. An integral depending wall 351 connected with said flange 349 and spaced from the wall 347 joins a flange 352 formed at the lower end of the hopper 311. Extending downwardly from flange 352 is a short wall 353 which is internally threaded. A die 375, similar to the dies of Figures 1 and 11, is positioned at the lower end of the hopper 311 with its lugs 376 extending into the notches 378 formed at the lower end of wall 347 of the hopper 311. Immediately below the die 375 is positioned a rotatable cutting disk 371. This disk is thicker than the cutting disk illustrated in Figures 1 and 11 in order to provide material at its periphery for forming integral teeth 357 so that the cutting disk 371 may also serve as a ring gear. The rotatable cutting disk 371 is positioned in proper relation to the die 375 by a ring 373 which is threaded into the end of wall 353 until the flange 374 on the ring 373 abuts against the lower-most end of the wall 353. Lugs 384 are formed integrally with the flange 374 to provide means for readily gripping the ring 373 to rotate it.

A gear wheel 361 positioned between the walls 347 and 351 of the hopper 311 meshes with the teeth on the rotatable cutting disk 371 and said gear is secured to the reduced end 362 of a stub shaft 365 by means of a tapered pin 366 which passes through aligned bores in the gear 361 and the reduced end 362 of shaft 365. A crank handle 319 is integrally connected with the shaft 365 to permit turning thereof by the hand of the operator. The bearing for the shaft 365 consists of a cylindrical sleeve 390 which is carried in a cylindrical extension 391 formed integrally with the depending wall 351. The shaft 365 is prevented from shifting axially in one direction by reason of a flange 392 at the junction of the shaft 365 and crank arm 319, which flange bears against the outer edge of extension 391, and the shaft is prevented from moving axially in the other direction by the gear 361 which bears against the inner surface of wall 351.

In assembling the apparatus illustrated in Figure 12 the gear 361 is first inserted between the walls 347 and 351 of hopper 311 and then the reduced end 362 of shaft 365 on crank arm 319 is inserted through the center of the gear in such a fashion that the pin 366 may be inserted through the bores of the reduced end 362 and the gear 361. The die 375 is then positioned at the lower end of the hopper 311 with its lugs 376 positioned in the notches 378 of the wall 347. The rotatable cutting disk 371 is then positioned immediately below the die 375 in such a manner that its gear teeth 357 mesh with the teeth on gear 361. The ring 373 is then threaded into the lower end of wall 353 until its flange 374 abuts the lowermost edge of the wall 353. At this time the rotatable cutting disk 371 is properly positioned relative to the die 375 and will find its bearing on the top surface of the ring 373.

It will be understood that the rotatable cutting disk 371 of Figure 12 may be replaced by rotatable members similar to those illustrated in Figure 6 and 8 which members would then be formed with integral gear teeth similar to the gear teeth 357 of disk 371.

Although preferred embodiments and modes of operation of my invention have been illustrated above, I do not intend to be limited to such structures, except in so far as the appended claims are so limited, since changes may be made in the above illustrated embodiments without departing from the scope of the invention which is defined in the following claims.

I claim:

1. In a food-processing device, in combination, a hopper for receiving food to be processed, means for impelling said food toward one end of the hopper, food comminuting means adjacent said one end of said hopper for operating on the food impelled toward it, said comminuting means including a rotatable member having openings therethrough, a flange on the outside of said hopper, driving means for said rotatable member, and a depending annular wall, connected with and removable from said flange, said wall being circumferentially spaced from the hopper and serving to support the driving means for the rotatable member.

2. In a food-processing device, in combination, a hopper for receiving food to be processed, means for impelling said food toward one end of said hopper, food comminuting means adjacent said one end of said hopper for operating on the food impelled toward it, said comminuting means including a rotatable member having openings therethrough and a non-rotatable die, a flange on the outside of said hopper, driving means for said rotatable member, a depending annular wall connected with and removable from said flange, said wall being circumferentially spaced from the hopper and serving to support the driving means for the rotatable member, and an annular member connected with the depending wall for supporting the rotatable member and die, said annular member being removable whereby the rotatable member and die may be removed.

EUGENE V. TAYLOR.

REFERENCES CITED

The following references are of record in the file of this patent:

UNITED STATES PATENTS

| Number | Name | Date |
|---|---|---|
| 441,279 | Campbell | Nov. 25, 1890 |
| 781,985 | Amon | Feb. 7, 1905 |
| 799,106 | Stevens | Sept. 12, 1905 |
| 1,149,954 | Schilly | Aug. 10, 1915 |
| 1,251,612 | Zanvettor | Jan. 1, 1918 |
| 1,533,208 | Pursell | Apr. 14, 1925 |
| 1,611,244 | Schmidt | Dec. 21, 1926 |
| 1,947,153 | Dellinger | Feb. 13, 1934 |
| 1,968,264 | Rice | July 31, 1934 |
| 2,017,960 | Faulds | Oct. 22, 1935 |
| 2,106,711 | Berkman | Feb. 1, 1938 |
| 2,161,480 | MacHaynes | June 6, 1939 |
| 2,183,804 | Bloomfield | Dec. 19, 1939 |
| 2,439,028 | Taylor | Apr. 6, 1948 |

FOREIGN PATENTS

| Number | Country | Date |
|---|---|---|
| 328,482 | Germany | Oct. 30, 1920 |
| 332,985 | Germany | Feb. 17, 1921 |
| 463,853 | Germany | Aug. 6, 1928 |
| 378,747 | Italy | Feb. 22, 1940 |